(12) United States Patent
Hurle et al.

(10) Patent No.: US 11,898,611 B2
(45) Date of Patent: Feb. 13, 2024

(54) SEPARATING CLUTCH WITH A RESTORING SPRING HAVING A POSITIVELY LOCKING CONNECTION, DRIVE TRAIN AND METHOD FOR ASSEMBLY

(71) Applicant: Schaeffler Technologies AG & Co. KG, Herzogenaurach (DE)

(72) Inventors: Thomas Hurle, Bühlertal (DE); Ivo Agner, Bühl (DE); Aurelie Keller, Herrlisheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/632,861

(22) PCT Filed: Aug. 25, 2020

(86) PCT No.: PCT/DE2020/100737
§ 371 (c)(1),
(2) Date: Feb. 4, 2022

(87) PCT Pub. No.: WO2021/047716
PCT Pub. Date: Mar. 18, 2021

(65) Prior Publication Data
US 2022/0282760 A1 Sep. 8, 2022

(30) Foreign Application Priority Data
Sep. 10, 2019 (DE) ............. 10 2019 124 190.1

(51) Int. Cl.
*F16D 25/10* (2006.01)
*F16D 13/71* (2006.01)
(Continued)

(52) U.S. Cl.
CPC ............ *F16D 25/10* (2013.01); *F16D 13/71* (2013.01); *F16D 25/0638* (2013.01); *F16D 2013/706* (2013.01)

(58) Field of Classification Search
CPC ................ F16D 13/52; F16D 25/0638; F16D 2013/706; F16D 13/70
See application file for complete search history.

(56) References Cited

U.S. PATENT DOCUMENTS 8,584,823 B2 * 11/2013 Phillips ................ F16D 25/061
192/48.612
2005/0027960 A1 12/2005 Sowul et al.
(Continued)

FOREIGN PATENT DOCUMENTS

CN 202149155 U 2/2012
CN 105705814 A 6/2016
(Continued)

OTHER PUBLICATIONS

Machine translation of DE-102018129257-A1, retrieved from espacenet.com (Year: 2023).*
(Continued)

*Primary Examiner* — Stacey A Fluhart

(57) ABSTRACT

A separating clutch for a drive train of a motor vehicle includes a torque forwarding component, an outer multiple disc carrier fixed to the torque forwarding component for conjoint rotation, a first plurality of friction discs, a second plurality of friction discs arranged to transmit torque through a non-positive connection with the first plurality of friction discs, a pressing element having a first side facing the friction discs and a second side, opposite the first side, facing away from the friction discs, and a restoring spring. The pressing element is for axially displacing a one of the first or second plurality of friction discs to realize the non-positive connection, and the restoring spring contacts the pressing
(Continued)

element for canceling the non-positive connection. The restoring spring engages through and behind the first side from the second side in a positively locking connection with the pressing element.

10 Claims, 7 Drawing Sheets

(51) Int. Cl.
*F16D 25/0638* (2006.01)
*F16D 13/70* (2006.01)

(56) References Cited

U.S. PATENT DOCUMENTS

| | | |
|---|---|---|
| 2005/0279605 A1 | 12/2005 | Sowul et al. |
| 2009/0321157 A1* | 12/2009 | Sowul ................. B60K 6/442 903/902 |
| 2011/0203894 A1* | 8/2011 | Nausieda ............ F16H 63/3026 192/70.11 |
| 2015/0247537 A1* | 9/2015 | Park .................... F16D 25/0638 192/85.25 |

FOREIGN PATENT DOCUMENTS

| | | |
|---|---|---|
| CN | 107228145 A | 10/2017 |
| CN | 109790877 A | 5/2019 |
| CN | 110065556 A | 7/2019 |
| DE | 102009059928 A1 | 7/2010 |
| DE | 102009059944 A1 | 7/2010 |
| DE | 112006001432 B4 | 5/2013 |
| DE | 102017130479 A1 | 8/2018 |
| DE | 102017130482 A1 | 8/2018 |
| DE | 102017008624 A1 * | 3/2019 |
| DE | 102018129257 A1 * | 6/2019 |
| DE | 102018129257 A1 | 6/2019 |
| DE | 102018113945 B3 | 9/2019 |
| FR | 3079573 A1 | 10/2019 |
| WO | 2015144161 A1 | 10/2015 |
| WO | 2018054411 A1 | 3/2018 |
| WO | WO-2018202236 A1 * | 11/2018 ............ F16D 21/06 |

OTHER PUBLICATIONS

Machine translation of DE-102017008624-A1, retrieved from espacenet.com (Year: 2023).*

* cited by examiner

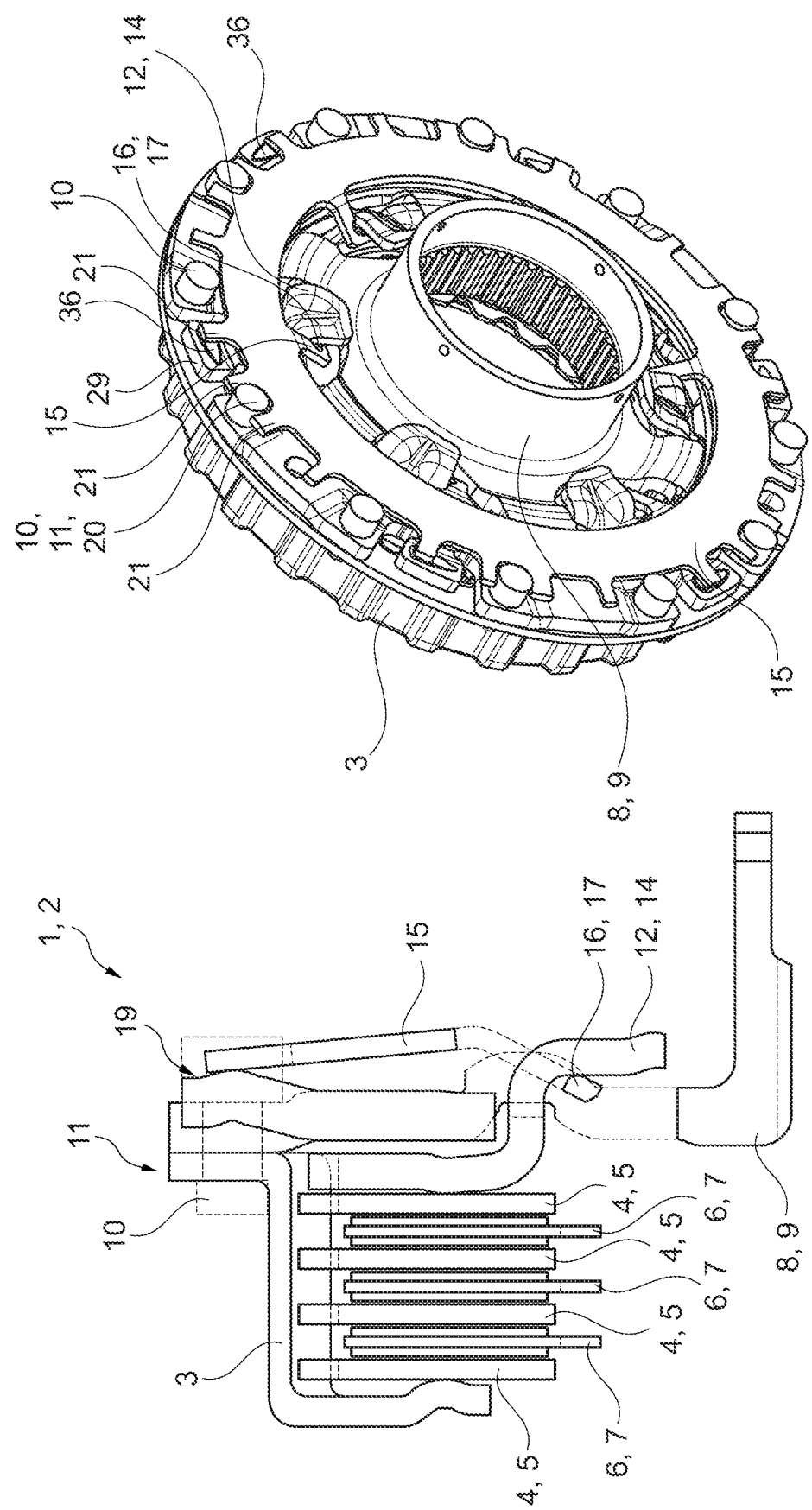

SEPARATING CLUTCH WITH A RESTORING SPRING HAVING A POSITIVELY LOCKING CONNECTION, DRIVE TRAIN AND METHOD FOR ASSEMBLY

CROSS-REFERENCE TO RELATED APPLICATIONS

This application is the United States National Phase of PCT Appln. No. PCT/DE2020/100737 filed Aug. 25, 2020, which claims priority to German Application No. DE102019124190.1 filed Sep. 10, 2019, the entire disclosures of which are incorporated by reference herein.

TECHNICAL FIELD

The present disclosure relates to a separating clutch in the form of a multi-disc clutch or multi-plate clutch, for example as a directly actuated dry (single) separating clutch for a drive train of a motor vehicle. The separating clutch has an outer multiple disc carrier in which friction discs, the outer discs, e.g. designed as steel discs, which are fixed in terms of rotation but can be moved axially, can be inserted, and which are prepared for forwarding torque when there is a complete or partial non-positive connection with mating friction discs, such as inner discs, e.g. designed as lined discs. The outer multiple disc carrier is fastened fixedly to a torque forwarding component, such as a hub, axially and for conjoint rotation, for example via a rivet, screw or weld connection. There is a pressing element, for example in the manner of a pressure pot or a lever, for axially displacing at least one of the friction discs for the non-positive connection case, and the pressing element is in contact with a restoring spring, which is provided for canceling the non-positive connection.

BACKGROUND

Due to requirements in hybridization, clutch requirements are tightened to the effect that they still have to provide their full functionality even in the case of smaller diameters and higher speeds. This applies not only to the torque transmission of the clutch, but also to other components in the clutch. This means that a small restoring spring in the clutch with a comparable number of discs, just like a large clutch, has to overcome the same air gap/engagement gap.

A minimum force is necessary because this force range is required to overcome a force hysteresis of the engagement system and to meet the dynamic requirements when pushing back the engagement system. Since with a small clutch the required force in the installation position should not be smaller, but should rather remain at a similar level, this means that a force edge of that restoring spring, for example designed as a disc spring, cannot be made as small as desired. However, if the diameter of the force edge were to be kept large, this would exceed the space constraints of modern hybrid arrangements. The speed requirements could also not be met, which would culminate in a reduced service life. The problems mentioned are exacerbated in particular when electric motors are coupled since these present particularly high circumferential speeds and high rotational speeds.

There are known dual clutch arrangements in which the restoring spring is located between the pressure pot and the unit which supports the engagement force. In this context, reference is made, for example, to WO 2015/144161 A1, which discloses a directly actuated dry clutch. This document discloses, inter alia, a friction clutch device with at least one pressure plate and a counter pressure plate, and with at least one leaf spring device which is combined with an adjusting device, wherein it is particularly emphasized that the adjusting device is designed as a tolerance compensation device that enables compensation for tolerances of the friction clutch device in its installation position.

SUMMARY

The present disclosure provides a separating clutch for use with adjacent components with particularly high circumferential speeds and high rotational speeds, without having to accept deficits regarding the service life of the individual parts. In particular, the installation space is used more efficiently.

The disclosed separating clutch includes a restoring spring that engages through and behind a pressing element from a side facing away from friction discs in a direction of the friction discs in order to enter into a positively locking connection with the pressing element.

Even in the case of high demands placed on installation space and difficult geometrical relationships, it no longer has to be accepted that installation space contours will be violated. It is no longer necessary for the pressure pot to surround the restoring spring with its feet. In the disclosed embodiment, the pressure pot does not protrude over the restoring spring. Rather, the restoring spring is screwed into the pressure pot with the help of press-back feet so that the restoring spring can be installed as the last and largest part and the restoring spring can nevertheless press back the pressing element/pressure pot. Thus, the restoring spring is screwed in behind the pressing element/the pressure pot so as to rest on the component unit supporting the engagement force/the hub. The pressure pot does not protrude beyond the restoring spring in the axial direction.

The positively locking connection may be achieved on the one hand by the (direct or indirect) bearing of an integral section of the restoring spring against the pressing element or an integral section of the pressing element against the restoring spring, or, on the other hand, the positively locking connection is achieved by the bearing of the restoring spring against an intermediate component, like a ring, which in turn bears against the pressing element. If the integral section of the restoring spring bears against the pressing element or, vice versa, the integral section of the pressing element bears against the restoring spring, little installation space is required in the axial direction and few individual components are required. This makes assembly easier and reduces manufacturing costs. A large variability of embodiments and the provision of a construction kit is made easier if the alternative is realized via the intermediate component.

The integral section may be at least partially oriented in the circumferential direction. A simple axial pushing together of the individual components with a subsequent screwing in to produce the rear engagement and positively locking connection can then be achieved in a manner similar to a bayonet lock solution. This makes assembly easier and allows dismantling.

If the pressing element is designed as a pressure pot or lever and/or the torque forwarding component is designed as a hub, standard solutions suitable for passenger cars and commercial vehicles can be developed and implemented. If, in addition or as an alternative, the torque forwarding component is used to support an engagement force that is used to cause axial displacement of the pressure pot when the non-positive connection is effected, good functionality is guaranteed over time, even under difficult operating conditions.

In order to be able to provide sufficient force from the restoring spring, the restoring spring may bear radially on the outside in a predefined support region of the hub, e.g., in the region of the pitch circle on which the outer multiple disc carrier is connected to the hub or in a region of the rivet connection there.

If the integral section of the restoring spring is designed as a free, hook-shaped end of a radially inwardly protruding flange of the restoring spring, the positively locking connection between the pressure pot and the restoring spring can simply be achieved during assembly by screwing in the restoring spring relative to the hub and the pressure pot. The result is an easy-to-assemble embodiment.

A compact embodiment follows when, on the one hand, the support region of the hub with the restoring spring, a support region of the pressure pot with the restoring spring and the restoring spring itself are designed geometrically such and, on the other hand, the restoring spring is designed in terms of its force capacity such that a part of the restoring spring furthest from the friction disc is arranged in all operating states on the friction disc side of the section of the pressure pot furthest from the friction disc.

In order to avoid unintentional dismantling, an anti-rotation lock may be provided for the restoring spring, for example by causing flank centering.

To prevent rotation, a position of the restoring spring may be rotationally secured after it has been screwed in to prevent the spring from unscrewing. A rivet connection may be chosen. However, a bending operation can also be used, which acts on a protruding tab/lobe. In this context, the rivet not only has the function of securing against unscrewing, but also connects the hub with the outer multiple disc carrier through its dual function. Owing to the bolt-like design of the rivet, the spring is centered over the wing recesses at the same time. When the transport lock is realized, no additional component is necessary, which is of an advantage. So-called twin drive transmissions can then be implemented in a skillful manner.

The anti-rotation lock may be produced using a bolt-like rivet, for example, which bears on the radially outwardly extending lobes of the restoring spring or is produced by at least one reshaped lobe of the restoring spring that is brought into a positively locking connection with the torque forwarding component. Since the lobe is a sheet metal section, non-cutting processing, for example deep-drawing, flanging or bending processing is recommended. This then results in high cycle times and low reject rates/minimal waste rates.

The rivet may also realize the rivet connection of the outer multiple disc carrier to the torque forwarding component.

The present disclosure also relates to a drive train of a motor vehicle in which a separating clutch of the type according to the above disclosure is used between two electric motors.

The present disclosure also relates to a method for assembling a separating clutch, which may be designed according to the above disclosure, wherein a restoring spring for a pressing element that moves the friction discs is inserted into a preassembled clutch, e.g., as the last component/the component predominantly furthest from the friction disc/the predominantly outermost component, in a manner engaging through the pressing element, then prestressed and screwed into direct or indirect contact with the pressing element, namely in order to enter into a positively locking connection with it, for example by means of engaging from behind.

In other words, the restoring spring may be screwed into the pressing element/activation element (for example, designed as a pressure pot or lever) in a form-fitting manner. The hook can be present on the restoring spring or on the pressing element. As an alternative to screwing in, an additional element could also subsequently support the spring, for example if a locking ring, a pressed additional part, a riveted additional part or a rivet without an additional part were set. A variant, however, is a flange between the pressing element and the restoring spring with a hook on the restoring spring and the screwing in of the restoring spring, as has already been explained.

This concept is further developed by providing a form-fitting anti-rotation lock via a rivet or lobe, wherein the lobe can be reshaped, and a flank centering is forced between the rivet and the lobe on the one hand and the restoring spring on the other hand.

When implementing a riveting anti-rotation lock, a triple function can also be achieved, namely in such a way that the rivet connects the outer multiple disc carrier and the hub to one another and implements the anti-rotation lock via flank centering on the restoring spring. Theoretically, it is also conceivable for the rivet to achieve an axial fastening to the radial outer side of the restoring spring. However, a simple contacting of the restoring spring is the usual case.

The disclosed clutch can also be developed with a focus on the adjustability and precision of the adjustment of the separating clutch:

It has also been shown that breakages often occur in restoring springs according to the background of the art. This circumstance has to be overcome.

For example, in a separating clutch of the type in question, this is solved in a further development in that the restoring spring bears radially (directly or indirectly) on the outside in a support region of the torque forwarding component, wherein the support region is designed to change the prestress of the restoring spring.

Owing to the increased force/displacement load due to the smaller diameters of the restoring springs, the mean stresses in restoring springs increase. This has a direct impact on the strength and service life of the spring. It is thus specifically counteracted here. While in multi-disc clutches no force adjustment is carried out on the restoring spring when the air gap has been set, this is done by adjusting the air gap. The usual variants of inserting a shim between an engagement system and a separating clutch to compensate for system tolerances also remain possible. The installation position of the clutch is then skillfully adapted to the engagement system. The clutches of the engagement system are therefore matched to one another in the overall assembly and the required air gap of the clutch is ensured. In addition, however, the force that can be provided by the restoring spring is now also set.

Another variant, which is known from the principle of compensating tolerances, namely the provision of a different friction disc/friction plate/steel disc, e.g., that which is closest to a pressing element, also remains possible. By providing an adjustment option at the radially inner end of the restoring spring and at the radially outer end of the restoring spring, firstly an axial tolerance is compensated for and secondly the position of the restoring spring is adapted. This is useful for directly actuated dry clutches, since the force adjustment is provided in the installation position. There is also no need for an additional adjustment piece which has to be bent in order to vary the prestress in the assembled state. This is an advantage over the background of the art, for example WO 2015/144 161 A1.

The installation position of the separating clutch is fixed in the case of a fixed air gap. By pairing the installation position of the separating clutch and the installation position of the engagement system with the help of "shimming"—that is, inserting a shim at the desired point—on the one hand, the position is ensured and, on the other hand, the force is adjusted with the specific change of the support region. Depending on the tolerance of the individual parts, there is a different prestress height for the restoring spring in its installation position and thus also a different force in the installation position of the separating clutch, but this is now compensated for. The small spring diameter, the constant minimum force requirement in the installation position and the individual geometric tolerances no longer lead to a higher load on the restoring spring, which benefits the service life of the spring. A possibility has thus been found to also adjust the force of the restoring spring in a specific manner after the air gap has been set. This reduces the force tolerance and thus the travel/working range of the spring and ensures the longevity of the spring.

In other words, it is finally possible to satisfy the two basic adjustment functions, on the one hand by using a shim disc and/or different discs, and on the other hand by changing the axial bearing of the support region and thus changing the support point at the radially outer end of the restoring spring, e.g. in the form of a disc spring.

In this development, the support position of the restoring spring can be plastically deformed. In this way, a tolerance compensation for the force in the installation position of the clutch can be realized. This is possible because the support lugs of the spring are still easily accessible after the clutch has been assembled and are designed in such a way that they can be reshaped with little effort. The focus is therefore on changing the prestress of a restoring element after the air gap has been set, bending a support region and/or inserting an element.

The support region may be provided by a support lug protruding radially outward, which is prepared for reshaping displacement during an adjustment process of the spring restoring force of the restoring spring or is prepared for receiving a shim. As a result, the position of the restoring spring remains independent of the tolerances and, for example, of the shims bearing radially on the inside of the restoring spring. By reshaping the support lug, the installation angle of the restoring spring is reduced, such that the prestress of the restoring spring relative to the load is reduced, but without falling below the minimum force requirement. The support lug is thus prepared for subsequent plasticizing/directing. This requires an adjustability of the spring force. The spring support region can be designed in one piece, but can also be realized in several parts. The spring support is directly or indirectly connected to the disc carrier.

If the support region is provided for a radially outwardly protruding support lug, which is prepared for reshaping displacement during an adjustment process of the spring restoring force of the restoring spring, the position and thus the force of the restoring spring can be adjusted quickly and inexpensively by a simple non-cutting machining process that acts in one direction. Alternatively, the usual use of shims is also possible at this point, namely when the support region is prepared for receiving such a shim. The position of the spring then remains independent of the tolerances and, for example, of the shims bearing radially on the inside of the spring.

A wedge may be formed on the surface of the support lug facing away from the friction discs, which wedge has a ramp which leads to a plateau running in an axial plane, wherein the axial plane is a plane through which the axis of rotation of the separating clutch runs perpendicularly. The restoring spring can then be neatly positioned.

In an example embodiment, the support lug borders two recesses in the material of the torque forwarding component, designed as a hub, in the circumferential direction. A precise bending of the support lug, without cracks, which would impair the fatigue strength, is then facilitated.

It is also possible to have the recesses aligned with one another at their radially inner ends, such that a predetermined bending point is specified.

The inner ends of a bending region may predefine support lugs.

An example embodiment is also designed in such a way that the recesses are based on or correspond to the contour of a sock or a child's foot.

The multitude of variants can be configured in a customer-friendly manner when the support region is made in one piece/part or in several pieces/parts.

The present disclosure also relates to a drive train of a motor vehicle with a separating clutch according to the above disclosure when it is used between two electric motors. It is here that the invention shows its advantage, namely in the targeted reaction to the extremely high rotational speeds and circumferential speeds that are present in electric motors.

The present disclosure also relates to a method for adjusting the spring force of a restoring spring of a separating clutch, for example of the type according to the above disclosure, wherein a radially outer force transmission region between a torque forwarding component and the restoring spring is axially displaced after the air gap of the separating clutch has been set.

This concept can be developed further if the axial displacement is brought about before operation by bending a/the support lug or by interposing a shim between the support lug and the restoring spring.

BRIEF DESCRIPTION OF THE DRAWINGS

The disclosure is further explained below with the aid of drawings. In the figures:

FIG. 1 shows a longitudinal section through a separating clutch according to the disclosure;

FIG. 2 shows a perspective view of the separating clutch from FIG. 1, with an inserted rivet acting as an anti-rotation lock between two lobes of the restoring spring;

DETAILED DESCRIPTION

Figure 3:
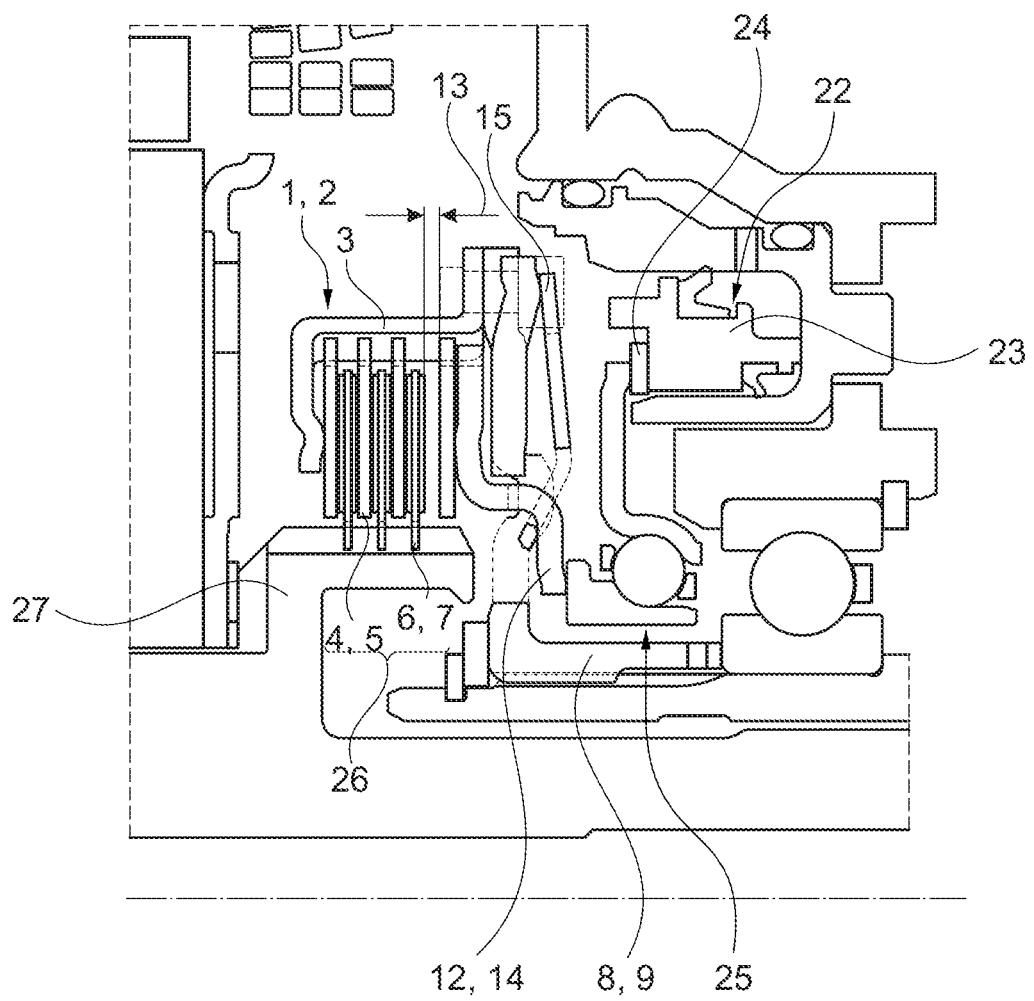
FIG. 3 shows a longitudinal section through a section of a drive train according to the disclosure, in which the embodiment of the separating clutch of FIGS. 1 and 2 is inserted.

The figures are only schematic in nature and serve only for comprehension of the invention. The same elements are provided with the same reference signs.

FIG. 1 shows a first embodiment of a separating clutch 1. The separating clutch 1 is designed as a multi-disc clutch 2 and has an outer multiple disc carrier 3. The outer multiple disc carrier 3 receives friction discs 4, which are designed as steel discs 5. These interact with mating friction discs 6, which are designed as lined discs 7. The lined discs 7 are connected in a non-rotatable manner to a coupling component 27 (not shown) (see FIG. 3).

If there is a non-positive connection between the steel discs 5 and the lined discs 7, torque is forwarded from a torque forwarding component 8, which is designed as a hub 9, to the coupling component, since the outer multiple disc carrier 3 is connected to the hub 9 via a rivet that is only hinted at (see FIG. 1). The rivet has the reference sign 10. It realizes a rivet connection 11. The non-positive connection is brought about when a pressing element/activation element 12 acts to transmit pressure on the friction disc 4 closest to it.

Figure 7:
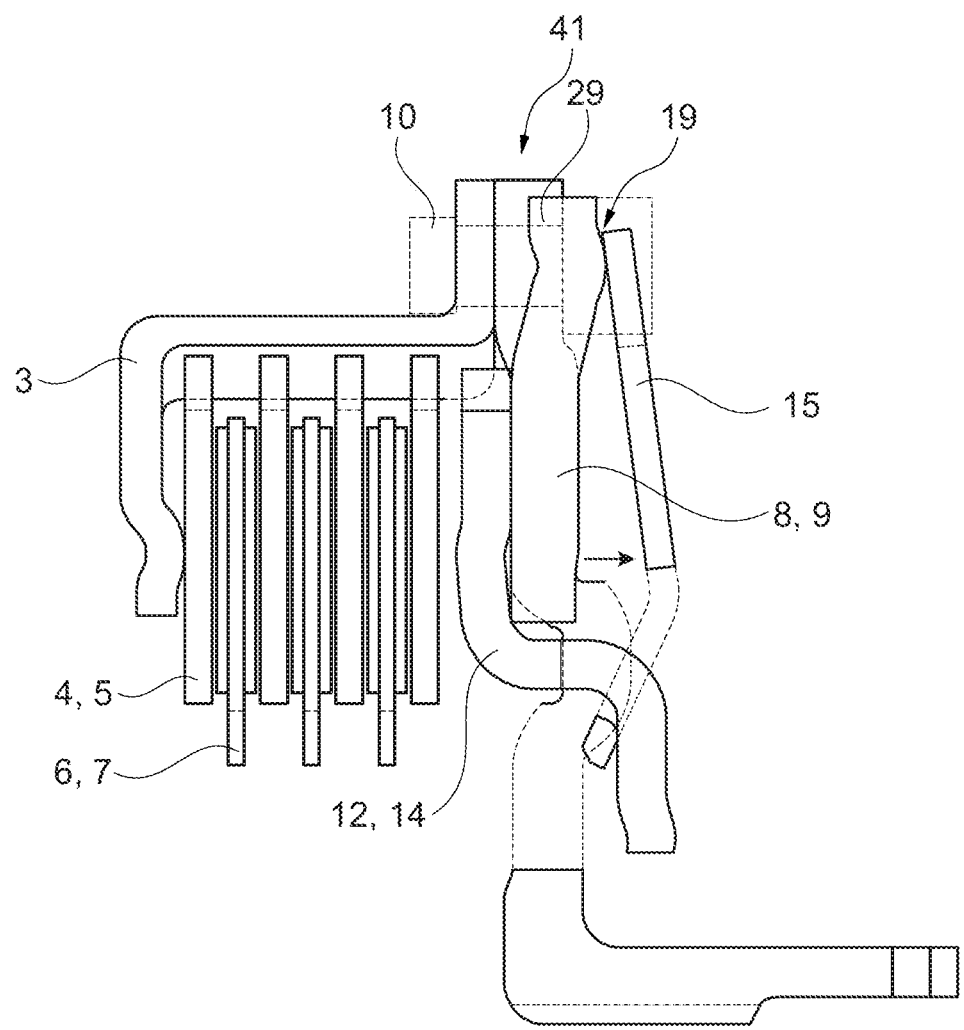
FIG. 7 shows the separating clutch from FIG. 1 in a transport state that is never present during operation, wherein, owing to the spring property of the restoring spring, the restoring spring is in a force-free position in which the pressure pot is pressed against the hub, whereby a transport lock is set and the clutch can be handled as a whole.
Figure 8:
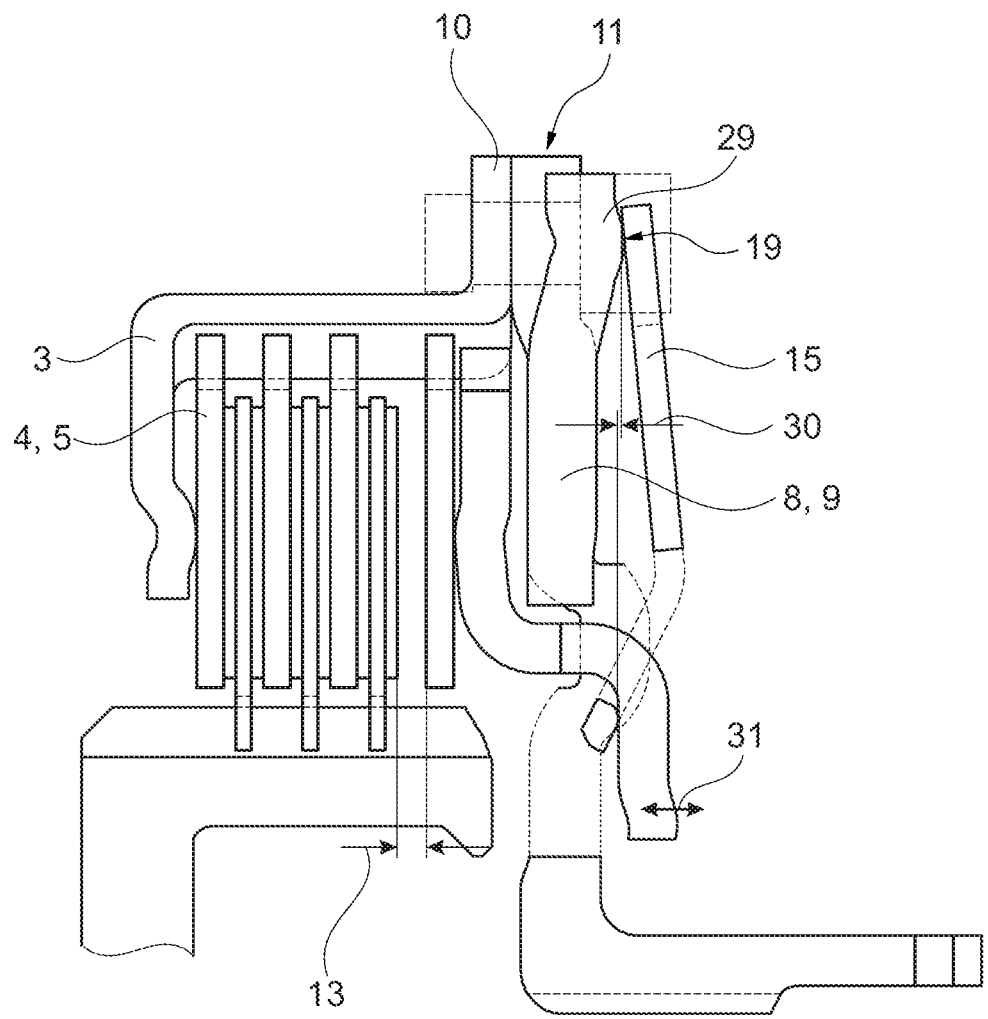
FIG. 8 shows a more detailed longitudinal sectional view of the embodiment of the separating clutch from FIG. 1, wherein an air gap to be kept constant is marked and an offset/location/position of the restoring spring that is kept variable by bending is shown in order to enable tolerance compensation for fine adjustment of the restoring force.

As soon as an air gap 13, as indicated in FIG. 8, has been overcome, a completely or partially existing non-positive connection between the friction discs 4 and the mating friction discs 6 is brought about for torque transmission. FIG. 1 shows the moment shortly before the non-positive connection is achieved. The pressing element 12 can be used as a lever or, as in the embodiment of FIGS. 1 to 10, be designed as a pressure pot 14.

A restoring spring 15 engages through and behind the pressing element 12. The restoring spring 15 has an integral section 16 which is present at the radially inner end. This integral section 16 runs at least in sections in the circumferential direction, which can be seen clearly in FIG. 2. This integral section 16 thus forms a press-back foot. One could also say that the integral section 16 forms a hook 17.

FIGS. 1 and 2 show that the hook 17 has come into contact with pressure pot feet/pressure pot tabs when the restoring spring 15 is screwed in/rotated in the circumferential direction relative to the pressing element 12/pressure pot 14 after assembly. A rear engagement is forced. This causes a positively locking connection between the restoring spring 15 and the pressure pot 14. The restoring spring 15 shown in FIG. 1 is already prestressed and bears with its radial outer side against a support region 19 of the hub 9 in the region of the rivet connection 11.

At least three of the rivets 10, however, have a special position, since they ensure an anti-rotation lock 20 between the restoring spring 15 and the hub 9. At least three of the rivets 10 engage precisely between two radially outwardly projecting tabs 21 of the restoring spring 15 in order to achieve flank centering. In the present embodiment, six such special rivets 10 are used, which cause said flank centering.

FIG. 3, in addition to the separating clutch 1, also shows a suitable engagement system 22. This engagement system 22 can use a piston 23 which uses a shim 24 to pair the installation position of the separating clutch 1 with the installation position of the engagement system 22. An actuating bearing 25 is axially displaced from the piston 23 via the shim 24, the actuating bearing 25 then engaging the pressing element 12 in an axially displaced manner. If the air gap 13 is then overcome, a disc pack 26 composed of the friction discs 4 and mating friction discs 6 comes into a state in which it can transmit torque. The air gap 13 is established when the separating clutch 1, as shown in FIG. 3, is in the set state.

Figure 6:
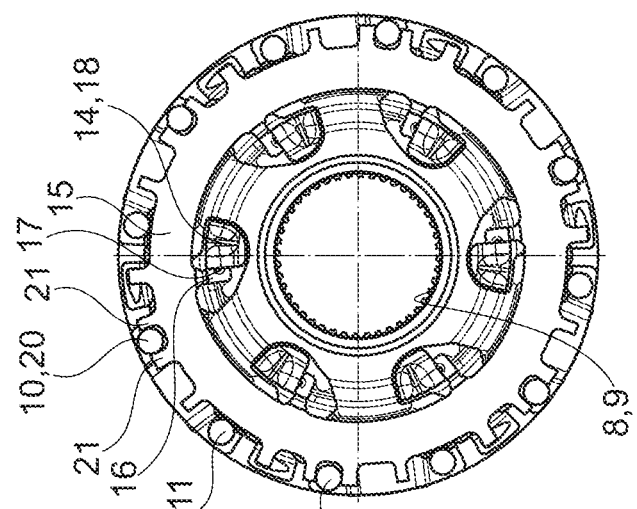
FIG. 6 shows an assembly time, after the assembly times of FIGS. 4 and 5, at which the separating clutch is shown in a representation comparable to that of FIG. 4, wherein, however, after the restoring spring is rotated, the position of the restoring spring is secured via a rivet, alternatively to which a bending operation of a protruding part of a tab would be provided.
Figure 5:
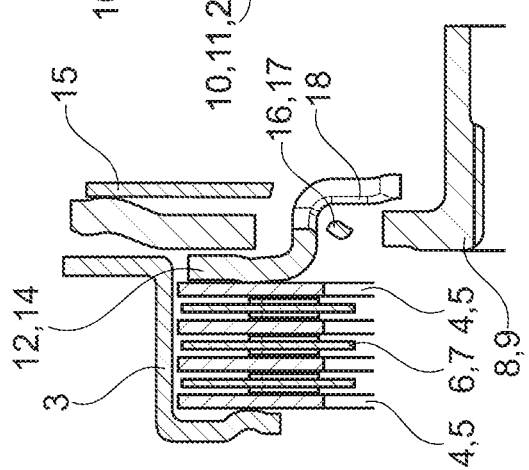
FIG. 5 shows a longitudinal section along the line V from FIG. 4 at the point in time before the restoring spring is rotated and the rear engagement/positively locking connection is produced, wherein the restoring spring is actuated/prestressed to such an extent that the press-back feet of the restoring spring can snap into place behind the pressure pot.
Figure 4:
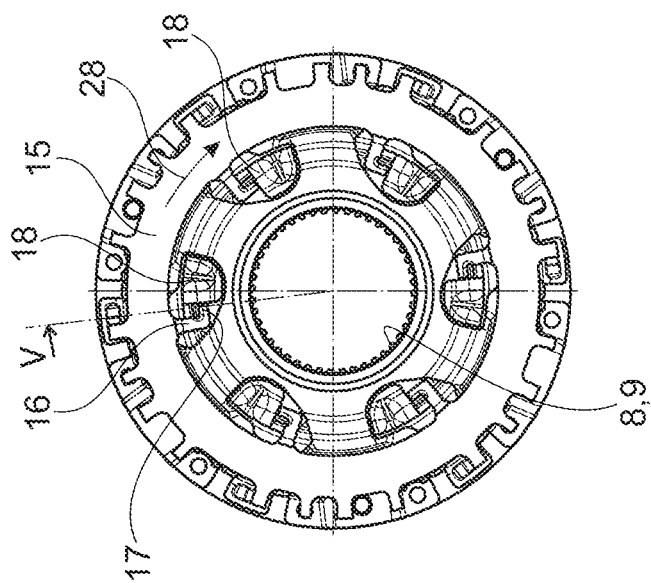
FIG. 4 shows a plan view of the separating clutch of FIGS. 1 to 3, wherein the press-back feet of the restoring spring protrude into recesses in a hub so that they can be operated through a window and then snap into place behind the pressure pot feet.

While in FIGS. 4 and 5 the restoring spring 15 is not yet in a positively locking connection, in particular in contact with the pressure pot 14 in the region of the hooks 17, the restoring spring 15 has already been rotated into its operating position in FIG. 6, and the hook 17 at the free end of the integral section 16 of the restoring spring 15 is in rear engagement with a pressure pot foot/a pressure pot tab 18 of the pressure pot 14. This state was achieved by rotating the restoring spring in the direction of arrow 28.

In FIG. 6, it is noticeable that only every second rivet, viewed in the circumferential direction, realizes the anti-rotation lock 20, whereas every first rivet 10 is only used to fasten the outer multiple disc carrier 3 to the torque forwarding component 8.

In FIG. 7, the pressure pot 14 is in contact with the hub 9. The support region 19 is provided by a support lug 29. The state shown in FIG. 7 occurs only before operation, in the transport state, namely when a transport lock is implemented. The restoring spring 15 is positioned so far that the pressure pot 14 bears against the hub 9. But even in this state, it is not completely without force. In operation, however, the pressure pot 14 should not come into contact with the hub 9, which is why the prestress of the restoring spring 15 should be selected in advance. For this purpose, it is recommended that the force of the restoring spring can be adjusted after the air gap 13 has been set. The distances are chosen such that the restoring spring 15 is always under prestress, even in the transport state.

In FIG. 8, as already explained, the air gap 13 to be kept constant is visualized, but to illustrate the necessity of a positional alignment of the restoring spring 15, a bending of the support lug 29 through a bending distance 30 covered during the adjustment is shown.

Figure 9:
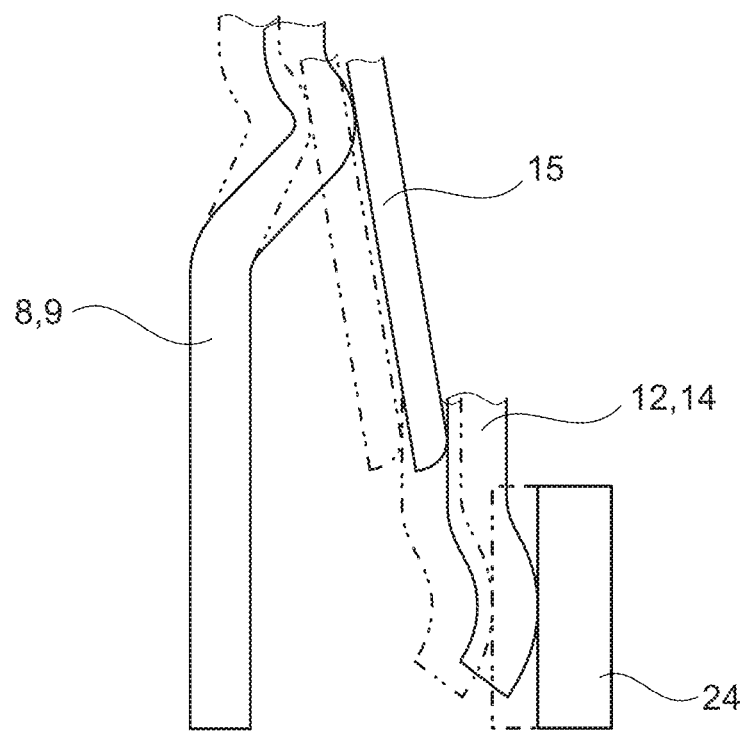
FIG. 9 shows a detail from FIG. 8 on a section of the hub, the restoring spring of the pressure pot and a shim at the point in time before the setting of the restoring spring force and after the setting of the restoring spring position, wherein bending of the support lug prevents too large a loading of the restoring spring during operation without then falling below the required minimum force, wherein the undirected height corresponds to the maximum tolerance position, and thus it is ensured that the bending can only take place in one direction, with the same force conditions always acting for the restoring spring, i.e. always the same spring load.

This bending distance 30 enables the restoring force of the restoring spring 15 to be set after shims 24 have been inserted (see FIG. 9). A restricted tolerance in relation to the restoring force is achieved here by bending. A height difference 31 is created through the use of shims 24, that is to say by causing a "shimming". This compensates for tolerances.

Figure 10:
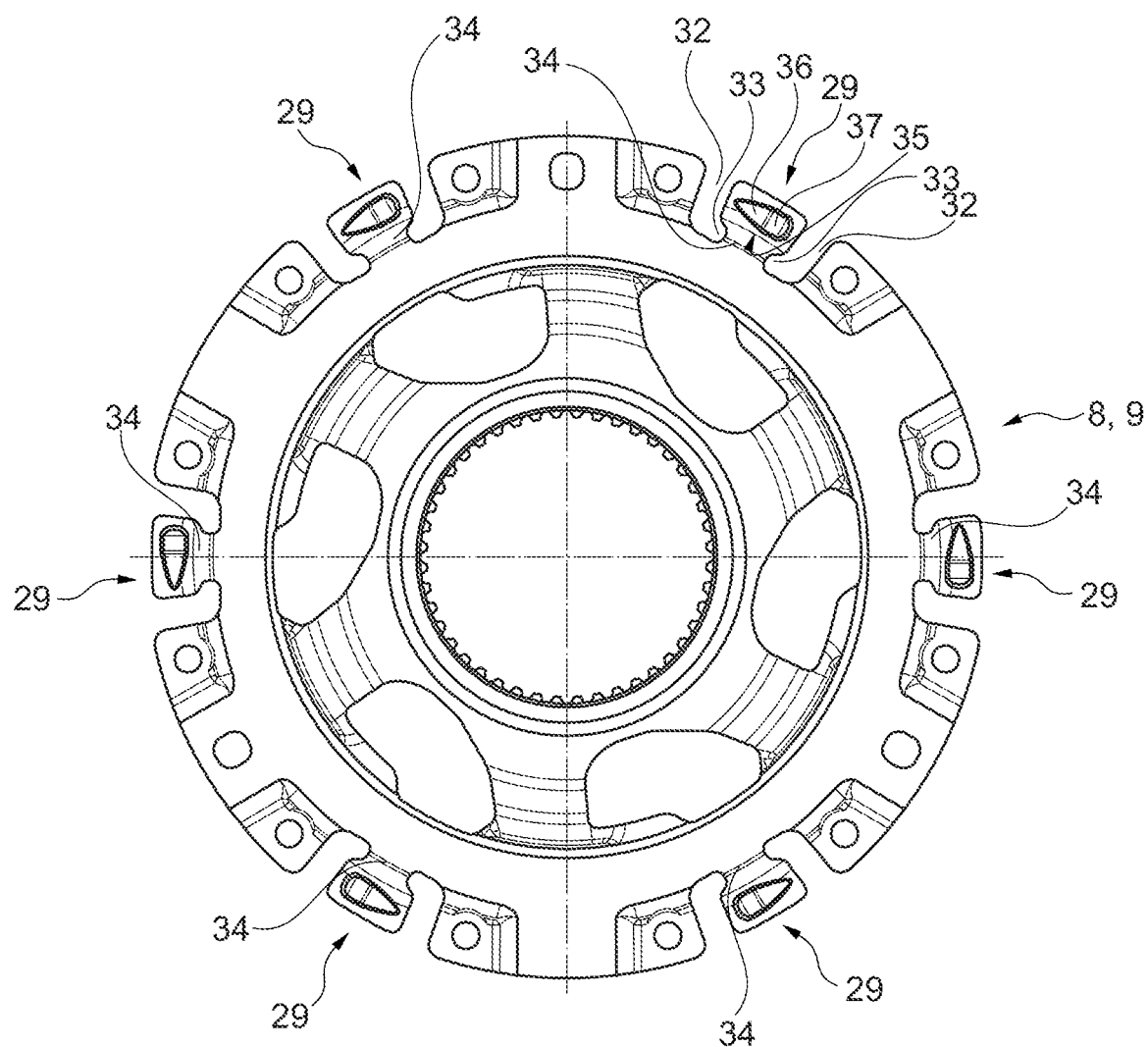
FIG. 10 shows a plan view of the torque forwarding component designed as a hub and an exposed support lug for subsequent plasticizing/directing of the spring force.

In the singular representation of the hub 9 in FIG. 10, the presence of six exposed support lugs 29 can be seen. Each support lug 29 is delimited by two recesses 32. Inner ends of two recesses 32 adjacent to a support lug 29 run towards one another. They define a bending region 34. If a die moves onto the support lug 29 after the "shimming" has been carried out, i.e. the compensation of axial offsets caused by tolerances, a bending can be forced in one direction in order to correct the position of the restoring spring 15. For turning the restoring spring 15 into its end position, it is advantageous if there is a wedge on the support lug 29 which has a ramp 36 which merges into a plateau 37. This is conducive to the precision of the clutch, since the tab 21 of the restoring spring 15 comes into contact precisely on the plateau 37 in order to precisely define the axial position.

REFERENCE NUMERALS

1 Separating clutch
2 Multi-disc clutch
3 Outer multiple disc carrier
4 Friction disc
5 Steel disc
6 Mating friction disc
7 Lined disc
8 Torque forwarding component
9 Hub
10 Rivet
11 Rivet connection
12 Pressing element/activation element
13 Air gap
14 Pressure pot
15 Restoring spring
16 Integral section
17 Hook
18 Pressure pot foot/pressure pot tab
19 Support region
20 Anti-rotation lock
21 Tab/lobe
22 Engagement system
23 Piston
24 Shim
25 Actuating bearing
26 Disc pack
27 Coupling component
28 Direction of rotation
29 Support lug
30 Bending distance
31 Height difference
32 Recess
33 Inner end
34 Bending region
35 Wedge
36 Ramp
37 Plateau

The invention claimed is:

1. A separating clutch for a drive train of a motor vehicle, comprising:
a torque forwarding component;
an outer multiple disc carrier fixed to the torque forwarding component for conjoint rotation;
a first plurality of friction discs rotationally fixed and axially displaceable relative to the outer multiple disc carrier;
a second plurality of friction discs arranged to transmit torque through a non-positive connection with the first plurality of friction discs;
a pressing element for axially displacing a one of the first plurality of friction discs or a one of the second plurality of friction discs to realize the non-positive connection, the pressing element comprising a first side facing the friction discs and a second side, opposite the first side, facing away from the friction discs;
a restoring spring comprising a radially outwardly extending lobe or tab; and
an anti-rotation lock comprising a rivet that bears on the radially outwardly extending lobe or tab, wherein:
the restoring spring contacts the pressing element for canceling the non-positive connection; and
the restoring spring extends through the pressing element from the second side to engage the first side in a positively locking connection.

2. The separating clutch of claim 1, wherein the positively locking connection comprises:
an integral section of the restoring spring bearing against the pressing element; or
an integral section of the pressing element bearing against the restoring spring; or
the restoring spring bearing against an intermediate component, which in turn bears against the pressing element.

3. The separating clutch of claim 2 wherein:
the positively locking connection comprises the bearing of the integral section of the restoring spring against the pressing element; and
the integral section of the restoring spring is at least partially oriented in a circumferential direction.

4. The separating clutch of claim 1 wherein:
the pressing element is a pressure pot; and
the torque forwarding component is a hub arranged to support an engagement force that axially displaces the pressure pot to realize the non-positive connection.

5. The separating clutch of claim 4 wherein:
the hub comprises a radially outside support region; and
the restoring spring bears against the hub on the radially outside support region.

6. The separating clutch of claim 1 wherein the rivet connects the outer multiple disc carrier with the torque forwarding component.

7. The separating clutch of claim 1 wherein the anti-rotation lock comprises a reshaped lobe of the restoring spring that is brought into a positively locking connection with the torque forwarding component.

8. A drive train of a motor vehicle comprising the separating clutch of claim 1 arranged in a torque path between two electric motors.

9. A method of assembling the separating clutch of claim 1, comprising:
providing a pre-assembled subassembly comprising the torque forwarding component, the outer multiple disc carrier, the first plurality of friction discs, the second plurality of friction discs, and the pressing element;
inserting the restoring spring through the pressing element;
prestressing the restoring spring; and
rotating the restoring spring so that it contacts the pressing element.

10. A method of assembling a separating clutch for a drive train of a motor vehicle, comprising:
   providing a pre-assembled subassembly comprising:
      a torque forwarding component;
      an outer multiple disc carrier fixed to the torque forwarding component for conjoint rotation;
      a first plurality of friction discs rotationally fixed and axially displaceable relative to the outer multiple disc carrier;
      a second plurality of friction discs arranged to transmit torque through a non-positive connection with the first plurality of friction discs; and
      a pressing element for axially displacing a one of the first plurality of friction discs or a one of the second plurality of friction discs to realize the non-positive connection, the pressing element comprising a first side facing the friction discs and a second side, opposite the first side, facing away from the friction discs;
   inserting a restoring spring through the pressing element;
   prestressing the restoring spring; and
   rotating the restoring spring so that the restoring spring contacts the pressing element for canceling the non-positive connection, wherein the restoring spring extends through the pressing element from the second side to engage the first side in a positively locking connection.

* * * * *